(12) United States Patent
Hunter et al.

(10) Patent No.: US 8,767,220 B2
(45) Date of Patent: Jul. 1, 2014

(54) AUTOMATED POSITIONING OF PRINTED IMAGES

(75) Inventors: Jonathan B. Hunter, Marion, NY (US);
Andrew James Bonacci, Webster, NY (US); David Mark Kerxhalli, Rochester, NY (US); Brian R. Conrow, Webster, NY (US); Michael J. Martin, Hamlin, NY (US)

(73) Assignee: Xerox Corporation, Norwalk, CT (US)

( * ) Notice: Subject to any disclaimer, the term of this patent is extended or adjusted under 35 U.S.C. 154(b) by 1113 days.

(21) Appl. No.: 12/702,774

(22) Filed: Feb. 9, 2010

(65) Prior Publication Data

US 2011/0194131 A1    Aug. 11, 2011

(51) Int. Cl.
*G06K 15/00*    (2006.01)

(52) U.S. Cl.
USPC ............ 358/1.12; 399/49; 382/167; 382/282; 358/2.1; 358/1.9; 358/1.6

(58) Field of Classification Search
None
See application file for complete search history.

(56) References Cited

U.S. PATENT DOCUMENTS

| | | | |
|---|---|---|---|
| 5,106,710 A * | 4/1992 | Wang et al. | 430/45.5 |
| 6,201,937 B1 * | 3/2001 | Folkins | 399/49 |
| 6,373,042 B1 | 4/2002 | Kretschmann et al. | |
| 6,754,384 B1 * | 6/2004 | Spaulding et al. | 382/167 |
| 7,202,888 B2 * | 4/2007 | Tecu et al. | 348/208.11 |
| 7,230,738 B2 * | 6/2007 | Zhang et al. | 358/1.9 |
| 7,271,935 B2 * | 9/2007 | Coons et al. | 358/2.1 |
| 7,630,653 B2 * | 12/2009 | Bonino | 399/15 |

OTHER PUBLICATIONS

U.S. Appl. No. 12/399,462, filed Mar. 6, 2009, Prabhat (Unpublished patent application).
U.S. Appl. No. 12/608,336, filed Oct. 29, 2009, Hoover et al (Unpublished patent application).

* cited by examiner

*Primary Examiner* — Ashish K Thomas
(74) *Attorney, Agent, or Firm* — Simpson & Simpson, PLLC (57) ABSTRACT

A method of calibrating a printing system for positioning at least one printed image, the printing system includes a first image bearing surface, the method includes: a) forming a background pattern and at least three fiducials on the first image bearing surface, wherein the background pattern is larger than a first printed image and the at least three fiducials are within an area formed by the first printed image; b) transferring a portion of the first printed image to a second image bearing surface; c) measuring a first residual image on the first image bearing surface, wherein the first residual image is a portion of the background pattern and the at least three fiducials remaining on the first image bearing surface after the step of transferring; and, d) calculating at least one calibration parameter for the printing system based on the measuring of the first residual image.

15 Claims, 4 Drawing Sheets

FIG. 4

AUTOMATED POSITIONING OF PRINTED IMAGES

INCORPORATION BY REFERENCE

The following co-pending applications are incorporated herein by reference in their entireties: U.S. patent application Ser. No. 12/399,462, filed on Mar. 6, 2009 and Ser. No. 12/608,336, filed on Oct. 29, 2009; and, the following patents are incorporated herein by reference in their entireties: U.S. Pat. Nos. 6,373,042 and 7,630,653.

TECHNICAL FIELD

The presently disclosed embodiments are directed to automated positioning of printed images, such as in digital copiers or facsimile machines, in particular relates to a system and method for adjusting image on paper (IOP) registration, and more particularly relates to a system and method to automatically calibrate IOP registration in a printing device.

BACKGROUND

Printing devices, including electrophotographic printing devices, require a system and method for achieving proper IOP registration. In a xerographic printing device, IOP registration may be achieved by controlling registration of an image bearing surface, such as a photoreceptor belt, an intermediate transfer belt if any, images to be transferred, and the substrate to which the image will be transferred.

IOP misregistration may be determined by measuring image offsets in the process and cross-process directions, image magnification in the process and cross-process directions, paper skew, and image skew. The process direction is the direction in which the substrate onto which the image is transferred and developed moves through the image transfer and developing apparatus. The cross-process direction, along the same plane as the substrate, is substantially perpendicular to the process direction. Paper skew is the angular deviation from the process direction of the substrate as it travels past the transfer zone. Image skew is the angular deviation of the raster output scanner scan lines from the process direction of the substrate, or a line normal to the process direction of the marked substrate.

Measurements such as those listed above may be made by printing a diagnostic image and taking measurements of the printed image. The printed image may be measured by hand using a magnifying eye loupe or may be scanned in and performed automatically. The results are then provided, typically manually, to a control system of the printing device. The control system uses the measurements to make adjustments for correcting any detected misregistration. The above process is performed offline (not inline), and requires human intervention, with the potential for human error. Moreover, this process is extremely time consuming, e.g., approximately forty-five minutes per page, and to obtain increased precision and accuracy and to minimize the effects of variability in the printing device, multiple diagnostic images may be printed, e.g., at least three images or as many as ten or more images. Unfortunately, increasing the number of diagnostic images does not reduce the time necessary for calibrating a printing device, and thus, each diagnostic image analyzed incurs approximately forty-five minutes of measurement time. As these measurements often occur during the assembly or installation of a printing device, the length of time for performing the assembly or installation are increased, and for the higher quality printing, such measurements may be made once per day or prior to beginning each print job.

In view of the foregoing, it should be appreciated that printing images, especially high quality duplex printing of images, i.e., double-sided printing, is difficult to perform while maintaining document-to-document and/or side-to-side accuracy. Some printing tolerances require image placement as accurate as 0.8 millimeters (mm) on a single sided document, which results in an accuracy requirement of 1.6 mm on a two sided document. Newer printing requirements further reduce printing tolerances to 0.2 mm for single sided documents and 0.4 mm for double sided documents. Under ideal conditions, the best result obtainable by manual measurement is about 0.25 mm to 0.3 mm for single sided documents; however, as described above, such measurements are extremely time consuming. Moreover, additional variability is introduced when different people perform the same measurements.

Meeting such stringent printing requirements is difficult, and a variety of solutions have been developed for attempting to accomplish such tolerances. Several solutions are described in the U.S. patents and patent applications included above; however, each of these solutions has drawbacks and deficiencies. For example, some of these solutions are limited to measuring skew on a leading edge of a document only, or merely attempt to quantify the above described measurements after an image has been printed, e.g., post fusing of toner on paper. Such post fusing measurements carry inherent errors merely by being taken after the fusing step. For example, the paper changes size as it passes through the fuser assembly, i.e., the paper shrinks due to evaporation of water or is stretched due to pressure on the paper. Moreover, depending on the type of paper, the extent of changes in size may vary, e.g., thinner paper changes more, e.g., 0.1-0.4% changes in size. Thus, for larger sizes of paper such as twenty-two inch paper, errors may be as great as 3-4 mm across the full length.

Furthermore, although image placement on an image bearing surface such as a photoreceptor belt may be tightly controlled, e.g., within thirty-five microns, variability in paper movement through the paper path introduces a wide variability in IOP registration. For example, speed control can make absolute measurements difficult to obtain. The leading edge of a piece of paper may be accurately determined; however, variability in the paper speed will affect image placement, and as such errors get integrated over longer distances, the errors accumulate, further increasing the difficulty of obtaining accurate absolute measurements.

The present disclosure addresses a system and method for automatically calibrating IOP registration of printed images in single and double sided printed documents and further calibrating IOP registration of printed images across multiple discrete documents.

SUMMARY

According to aspects illustrated herein, there is provided a method of calibrating a printing system for positioning at least one printed image, the printing system includes a first image bearing surface, the method includes: a) forming a background pattern and at least three fiducials on the first image bearing surface, wherein the background pattern is larger than a first printed image and the at least three fiducials are within an area formed by the first printed image; b) transferring a portion of the first printed image to a second image bearing surface; c) measuring a first residual image on the first image bearing surface, wherein the first residual image is a portion of the background pattern and the at least three fiducials remaining on the first image bearing surface after the step of transferring; and, d) calculating at least one calibration parameter for the printing system based on the measuring of the first residual image.

According to other aspects illustrated herein, there is provides an apparatus for calibrating a printing system for positioning at least one printed image. The apparatus includes a first image bearing surface arranged to receive a background pattern and at least three fiducials, wherein the background pattern is larger than a first printed image and the at least three fiducials are within an area formed by the first printed image, a second image bearing surface arranged to receive the first printed image from the first image bearing surface, an image sensing device arranged to measure a first residual image on the first image bearing surface, wherein the first residual image is a portion of the background pattern and the at least three fiducials remaining on the first image bearing surface after the first printed image is transferred to the second image bearing surface and an arithmetic logic unit arranged to calculate at least one calibration parameter for the printing system based on measurements of the first residual image.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "image bearing surface" is intended to mean any surface or material capable of receiving an image or a portion of an image, e.g., a photoreceptor drum, a photoreceptor belt, an intermediate transfer belt, an intermediate transfer drum, an imaging drum, or a document. Furthermore, as used herein, "average" and/or "averaging" should be construed broadly to include any algorithm or statistical process having as inputs a plurality of signal outputs, for any purpose.

Still further, as used herein, "fiducial" and "fiducial mark" should be construed broadly to include any marking, e.g., cross hairs, bulls eye, points, line, mark, portion of an impression, etc., used to designate a position on a printed image. Moreover, the words "printer," "printer system" and "printing system" as used herein encompasses any apparatus, such as a digital copier, bookmaking machine, facsimile machine, multi-function machine, etc. which performs a print outputting function for any purpose. Additionally, as used herein, "sheet," "sheet of paper" and "paper" refer to, for example, paper, transparencies, parchment, film, fabric, plastic, photofinishing papers or other coated or non-coated substrate media in the form of a web upon which information or markings can be visualized and/or reproduced. The term "skew" as used herein refers to a physical orientation of an image relative to the substrate media upon which it is affixed, in particular, "skew" refers to a misalignment, slant or oblique orientation of an edge of the substrate media relative to an image placed thereon.

Although a monochrome printing apparatus has been primarily described herein, the claims can encompass embodiments that print in color or handle color image data. Moreover, although any methods, devices or materials similar or equivalent to those described herein can be used in the practice or testing of these embodiments, some embodiments of methods, devices, and materials are now described.

It has been found that to optimize and/or calibration IOP registration, a variety of measurements should be obtained, and based on those measurements, a variety of printing parameters may be controlled/modified. The variety of measurements is discussed infra. Six modifiable printing parameters which have been found to be useful include three toner/ink deposition parameters and three paper movement parameters. The three toner/ink deposition parameters include process direction magnification, cross-process (also know as lateral) direction magnification and squareness, while the three paper movement parameters include process position, cross-process (also known as lateral) position and skew. The following discussion is from the perspective of printing an image on a rectangular sheet of paper in what is commonly known as a portrait orientation, i.e., the longer edge of the sheet is parallel with the process direction.

Process direction magnification is scaling the size of the printed image in the process direction, or in other words, increasing or decreasing the length of the image on the sheet relative to the sheet's top edge to the bottom edge. Cross-process or lateral direction magnification is scaling the size of the printed image in the cross-process or lateral direction, or in other words, increasing or decreasing the width of the image on the sheet relative to the sheet's side edges. Squareness is used to control whether the corners of the printed image are approximately ninety degrees, or whether the corners of the printed image vary from ninety degrees, e.g., the image forms a parallelogram. Process position is where the image begins on the paper, e.g., distance from the lead edge position. The cross-process or lateral position is where the image is located relative to the sides of the paper. Lastly, skew is the amount of image rotation without distortion. As described in greater detail infra, by measuring a diagnostic/calibration image and adjusting the foregoing six parameters, IOP registration can be accurately controlled thereby allowing a printing system to meet or exceed printing tolerances.

Figure 1:
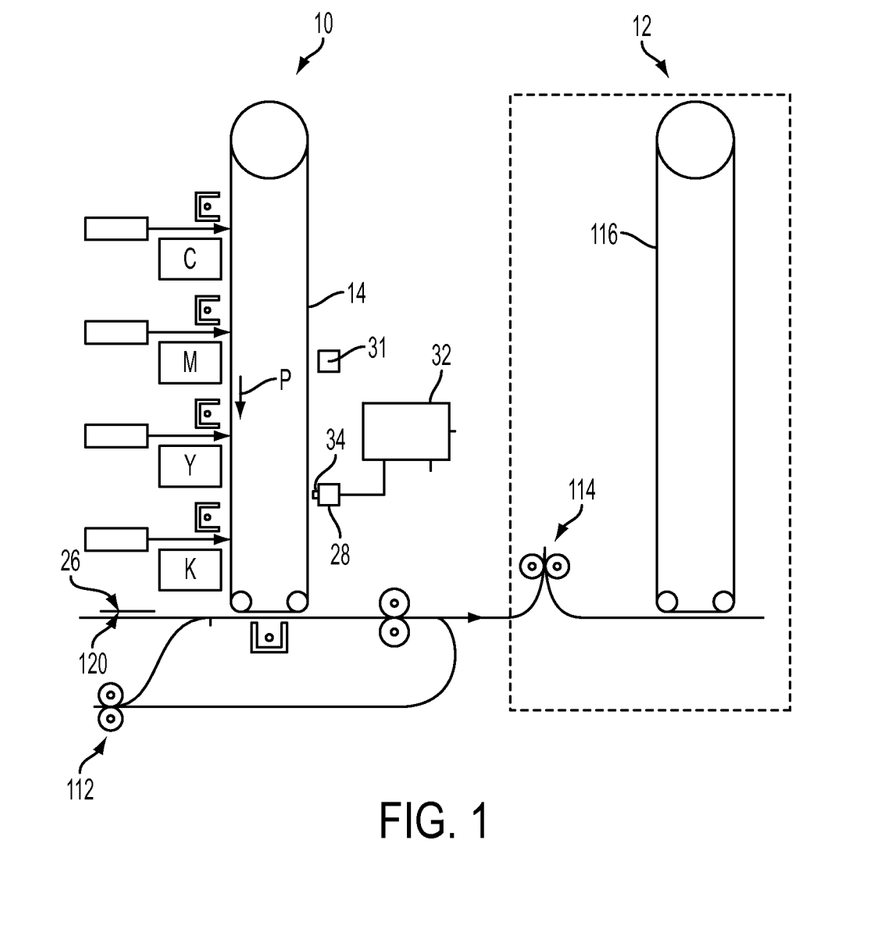
FIG. 1 is a simplified elevational view of basic elements of a first xerographic color printer, showing a context of the various embodiments, including a second xerographic color printer tandemly arranged relative to the first xerographic color printer.
Figure 2:
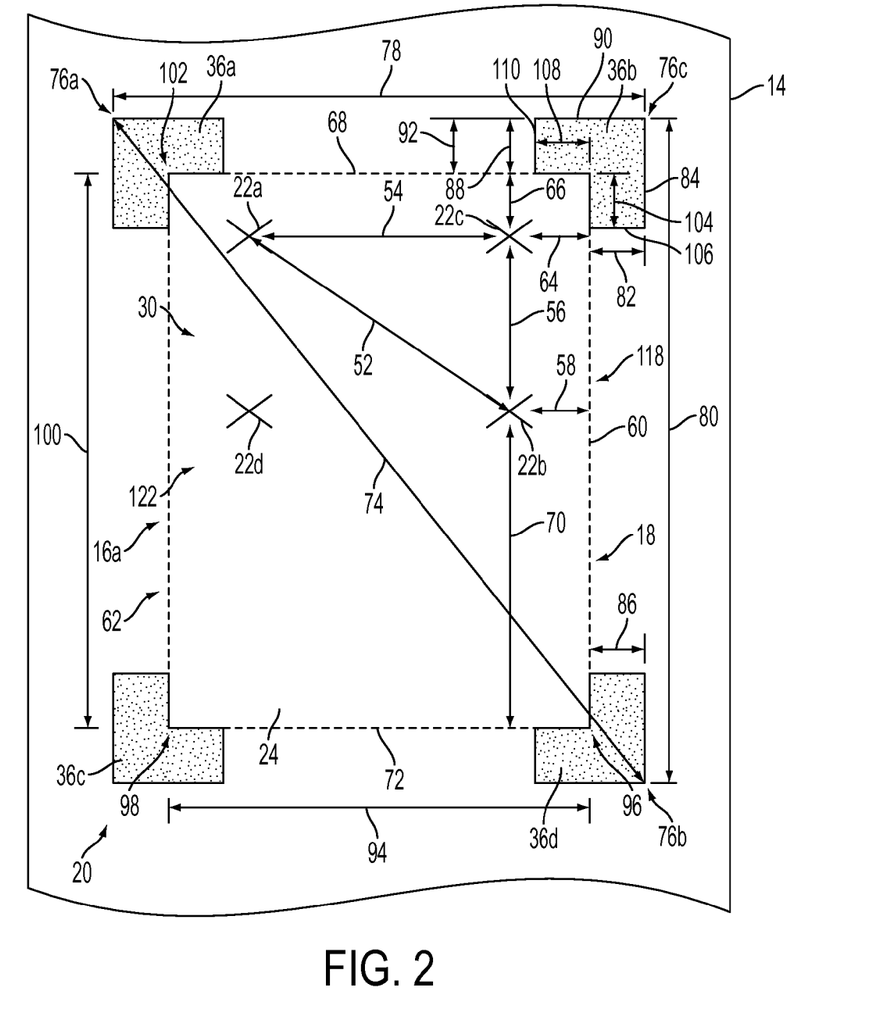
FIG. 2 is a portion of an image bearing surface showing an embodiment of a diagnostic image.
Figure 3:
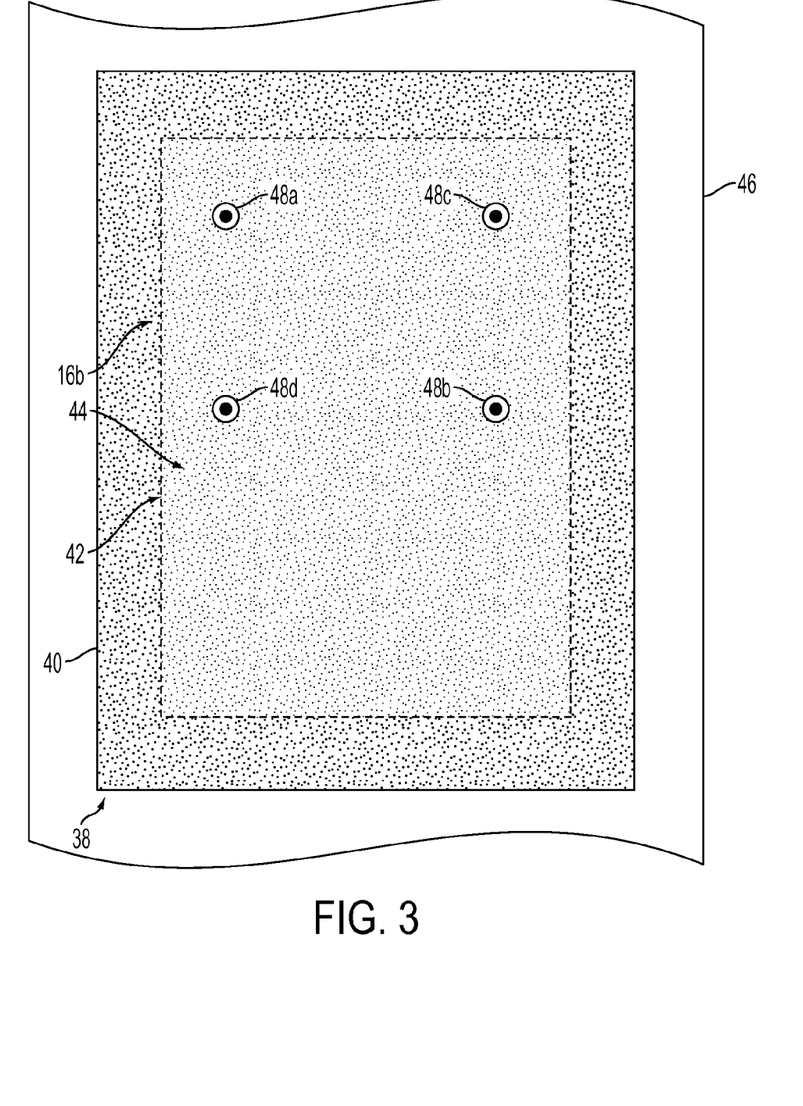
FIG. 3 is a portion of an image bearing surface showing another embodiment of a diagnostic image; and, FIG. 4 is a portion of an image bearing surface showing yet another embodiment of a diagnostic image.
Figure 4:
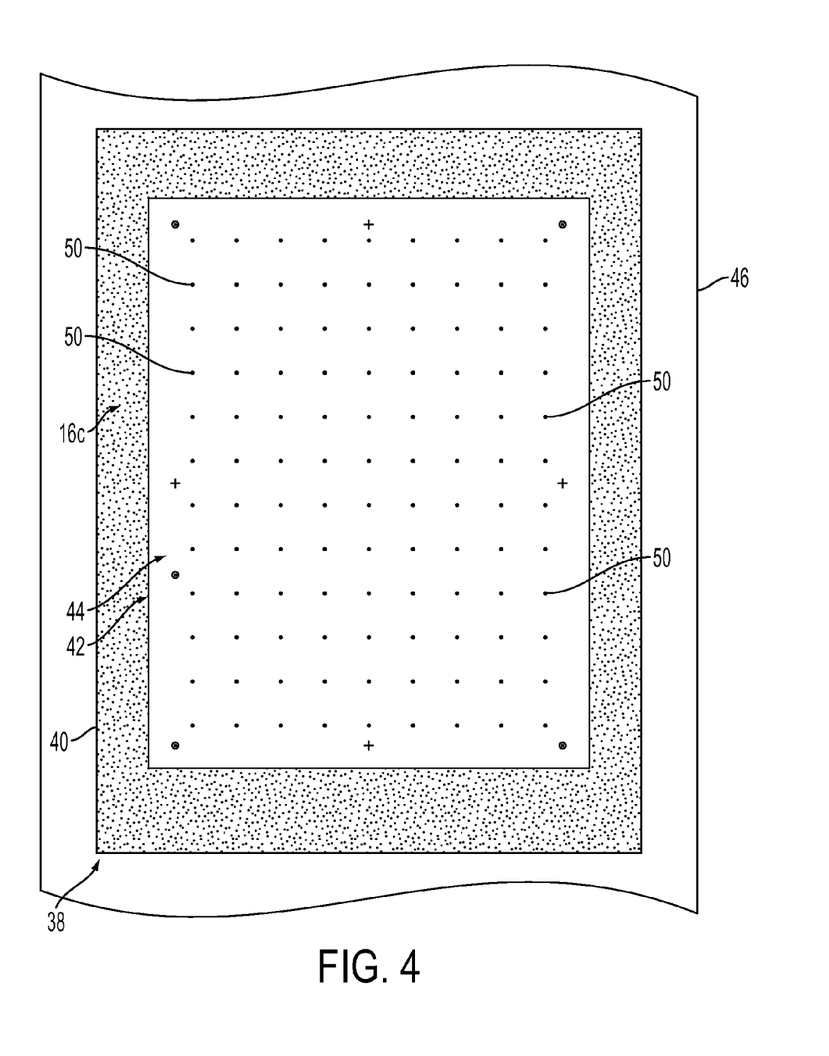

FIG. 1 shows a simplified elevational view of basic elements of first xerographic color printer 10, showing a context of the various embodiments, including second xerographic color printer 12 tandemly arranged relative to first xerographic color printer 10, while FIG. 2 shows a portion of image bearing surface 14 showing an embodiment of a diagnostic image, e.g., diagnostic image 16a. FIG. 3 shows a portion of image bearing surface 14 showing another embodiment of a diagnostic image, e.g., diagnostic image 16b, while FIG. 4 shows a portion of image bearing surface 14 showing yet another embodiment of a diagnostic image, e.g., diagnostic image 16c. The following is best understood in view of FIGS. 1 through 4.

An embodiment broadly comprises an apparatus for calibrating a printing system, e.g., color printer 10 and/or color printer 12, for positioning at least one printed image, e.g., printed image 18. The system comprises a first image bearing surface, e.g., image bearing surface 14, arranged to receive background pattern 20 and at least three fiducials, e.g., fiducials 22a, 22b, 22c and 22d. It should be appreciated that although only four fiducials are shown in FIGS. 2 and 3, more than four fiducials may also be used and such arrangements are discussed herebelow in view of FIG. 4. Background pattern 20 is larger than first printed image 18 and the at least three fiducials are positioned within area 24 formed by first printed image 18. Second image bearing surface 26 is arranged to receive first printed image 18 from first image bearing surface 14. Image sensing device 28 is arranged to measure first residual image 30 on first image bearing surface 14. It should be appreciated that first residual image 30 is the portion of background pattern 20 and the at least three fiducials remaining on first image bearing surface 14 after first printed image 18 is transferred to second image bearing surface 26. Moreover, image sensing device 28 may be positioned before or after erase device 31, which device is generally familiar in xerography and other printing arts as a device used to remove residual marking material, e.g., toner or ink, from an image bearing surface. It should be appreciated that "before" is intended to mean that erase device 31 is arranged between the location of transferring first printed image 18 to second image bearing surface 26 and the location of image sensing device 28, while "after" is intended to mean that image sensing device 28 is located between the location of transferring first printed image 18 to second image bearing surface 26 and the location of erase device 31. Arithmetic logic unit 32 is arranged to calculate at least one calibration parameter for the printing system based on measurements of first residual image 30. In some embodiments, image sensing device 28 comprises an array of photosensors 34. For example, an array of photosensors may be a linear array, a full width array or other photosensor arrays known in the art. It should be appreciated that although the embodiments disclosed herein are directed at an image sensing device which comprises an array of photosensors, other embodiments are also possible, e.g., a two-dimensional array of photosensors, a photosensor device in combination with an optical system, etc., and such variations are within the spirit and scope of the claimed embodiments. It should be further appreciated that unit 32, although not shown, is in communication with the control unit for printer 10, and in a tandem printer arrangement also in communication with the other printers. Such arrangements provide coordinated control of one or more printers for IOP registration.

Another embodiment broadly comprises a method of calibrating a printing system, e.g., color printer 10 and/or color printer 12, for positioning at least one printed image, e.g., printed image 18. The printing system comprises a first image bearing surface, e.g., first image bearing surface 14. The method comprises: a) forming background pattern 20 and at least three fiducials, e.g., fiducials 22a, 22b, 22c and 22d, on first image bearing surface 14, wherein background pattern 20 is larger than first printed image 18 and the at least three fiducials are within area 24 formed by first printed image 18; b) transferring a portion of first printed image 18 to second image bearing surface 26; c) measuring first residual image 30 on first image bearing surface 14, wherein first residual image 30 is a portion of background pattern 20 and the at least three fiducials, e.g., fiducials 22a, 22b, 22c and 22d, remaining on first image bearing surface 14 after the step of transferring; and, d) calculating at least one calibration parameter for the printing system based on the measuring of first residual image 30.

It should be appreciated that the three toner/ink deposition parameters and three paper movement parameters described above are the calibration parameters calculated in this embodiment. Thus, the calibration parameters, include but are not limited to, a process direction magnification factor; a cross-process direction magnification factor; a squareness factor; a process direction position factor; a cross-process direction position factor; a skew factor; and, combinations thereof.

In some embodiments, background pattern 20 comprises at least three patches, e.g., patches 36a, 36b, 36c and 36d. As can be clearly seen in FIG. 2, each of these patches is in registered alignment with and partially overlaps each of the corners of first printed image 18. It should be appreciated that the foregoing embodiments require at least three patches in order to perform the necessary calculations to obtain the calibration parameters; however, more than three patches may also be used, e.g., four patches as shown in FIG. 2, and such embodiments are within the spirit and scope of the claims. In other embodiments, the background pattern, e.g., background pattern 38, may be substantially uniform over area 40 formed by background pattern 38. This arrangement is clearly shown in FIGS. 3 and 4 wherein background pattern 38 is larger than and surrounds printed image 42, and thus also is larger than and surrounds residual image 44, i.e., the portion of printed image 42 remaining on image bearing surface 46 after printed image 42 is transferred to another image bearing surface, e.g., a sheet of paper.

Moreover, as can be see in FIGS. 2, 3 and 4, the fiducial marks may take a variety of forms in the various embodiments. For example, as shown in FIG. 2, fiducials 22a, 22b, 22c and 22d may be cross hairs. Similarly, as shown in FIG. 3, fiducials 48a, 48b, 48c and 48d may be bulls eyes. In like fashion, as shown in FIG. 4, fiducials 50 may be a plurality of discreet points. In such embodiments, sufficient data is available for analyzing nonlinear printing effects. It should be appreciated that the foregoing embodiments of fiducials are not limiting and other fiducial marks may also be used, e.g., triangles, squares, asterisks, etc., and such variations are within the spirit and scope of the claimed embodiments. It should be further appreciated that using additional background patches and additional fiducials allows for greater numbers of measurements which in turn permits averaging of calculated calibration parameters. The averaging of calibration parameters permits a greater reduction in printing errors, i.e., provides further improvement of IOP registration. Furthermore, in embodiments having background patterns like background pattern 38, the fiducials are printed on and included within the area formed by the background pattern.

A variety of measurements may be obtained from the background pattern, fiducials and residual images which allow for the calculation of the above described calibration parameters. It should be appreciated that depending on the printing system needs, one or more of the measurements described below may be obtained and the embodiments described below are only examples of possible measurements and do not limit the scope of the embodiments to these measurements.

The following measurements may be obtained for use in calculating the various calibration parameters: first distance 52 between first fiducial 22a and second fiducial 22b; second distance 54 between first fiducial 22a and third fiducial 22c; third distance 56 between second fiducial 22b and third fiducial 22c; fourth distance 58 between second fiducial 22b and first edge 60 of transferred portion 62 of first printed image 18; fifth distance 64 between third fiducial 22c and first edge 60 of transferred portion 62 of first printed image 18; sixth distance 66 between third fiducial 22c and second edge 68 of transferred portion 62 of first printed image 18; seventh distance 70 between second fiducial 22b and third edge 72 of transferred portion 62 of first printed image 18; eighth distance 74 between first corner 76a and second corner 76b of background pattern 20; ninth distance 78 between first corner 76a and third corner 76c of background pattern 20; tenth distance 80 between second corner 76b and third corner 76c of background pattern 20; eleventh distance 82 between first edge 60 of transferred portion 62 of first printed image 18 and first edge 84 of background pattern 20; twelfth distance 86 between first edge 60 of transferred portion 62 of first printed image 18 and first edge 84 of background pattern 20, wherein the location of measurement of twelfth distance 86 is offset from the location of measurement of eleventh distance 84; thirteenth distance 88 between second edge 68 of transferred portion 62 of first printed image 18 and second edge 90 of background pattern 20; fourteenth distance 92 between second edge 68 of transferred portion 62 of first printed image 18 and second edge 90 of background pattern 20, wherein the location of measurement of fourteenth distance 92 is offset from the location of measurement of thirteenth distance 88; fifteenth distance 94 between first corner 96 and second corner 98 of transferred portion 62 of first printed image 18; and, sixteenth distance 100 between second corner 98 and third corner 102 of transferred portion 62 of first printed image 18.

In some embodiments, the following measurements may also be obtained for use in calculating the various calibration parameters: seventeenth distance 104 between first edge 60 of transferred portion 62 of first printed image 18 and first edge 106 of patch 36b; and, eighteenth distance 108 between second edge 68 of transferred portion 62 of first printed image 18 and second edge 110 of patch 36b.

As can be appreciated in view of FIG. 2, second and third edges 68 and 72, respectively, are oppositely disposed relative to each other. Moreover, a line formed between first and third corners 76a and 76c, respectively, and a line formed between second and third corners 76b and 76c, respectively, are substantially orthogonal relative to each other.

As described above, the calibration parameters may be calculated based on the foregoing measurements. For example, the process direction magnification factor can be obtained by analyzing distance 52, distance 56, distance 66, distance 70 and distance 100. Similarly, the cross-process magnification factor can be obtained by analyzing distance 52, distance 54, distance 58, distance 64 and distance 94. In like fashion, the squareness factor can be obtained by analyzing distance 56, distance 58, distance 64, distance 66, distance 70 and distance 100. The process direction position factor can be obtained by analyzing distance 66, while the cross-process direction position factor can be obtained by analyzing distance 64. Lastly, the skew factor can be obtained by analyzing distance 82, distance 86, distance 88 and distance 92. Although, only a few examples are discussed regarding how the various calibration parameters are determined, one of ordinary skill in the art will appreciate that there are a variety of methods of determining the calibration parameters from the foregoing set of measurements, and such methods are within the spirit and scope of the claimed embodiments.

The foregoing embodiments may include a single printing device, e.g., color printer 10, or they may include a plurality of printing devices, color printers 10 and 12. For the embodiments arranged for duplex printing, i.e., double sided printing, which may be performed by one or more printing devices, a duplexer must be included within the paper path, e.g., duplexer 112 or 114. In the arrangement shown in FIG. 1, printers 10 and 12, having duplexer 114 therebetween are oriented in what is commonly known as a tandem arrangement. Such an arrangement is capable of high speed double sided printing; however, IOP registration must be calibrated so that both printers 10 and 12 are matched. If such matching does not occur, then double sided images produced on this printing system may include misalignment between the two sides, which result is undesirable.

It should be appreciated that when performing duplex printing, in either a single printer arrangement or a multi-printer arrangement, the foregoing method is improved by including the following steps: e) forming background pattern 20 and the at least three fiducials on third image bearing surface 116, wherein background pattern 20 is larger than second printed image 118 and the at least three fiducials are within an area formed by second printed image 118; f) transferring a portion of second printed image 118 to fourth image bearing surface 120; g) measuring second residual image 122 on third image bearing surface 116, wherein second residual image 122 is a portion of background pattern 20 and the at least three fiducials remaining on third image bearing surface 116 after the step of transferring is performed; and, h) calculating at least one calibration parameter for the printing system based on the measuring of second residual image 122. In the embodiments of the printing system where only one printing device is included, the first and third image bearing surfaces are the same surface, e.g., first image bearing surface 14. Contrarily, in the embodiments of the printing system where two or more printing devices are included, the first and third image bearing surfaces are different surfaces, e.g., first image bearing surface 14 and third image bearing surface 116. Moreover, in some of the embodiments of the printing system where only one printing device is included, the second and fourth image bearing surfaces may be disposed on opposite sides of a common surface, e.g., opposite sides of a sheet of paper.

Although in the embodiments described above, the entire background pattern and printed image are captured and analyzed, it should be appreciated that the foregoing measurements and calculation of calibration parameters can occur with measuring only a portion of the residual image and background pattern, e.g., only measuring the corner patches and fiducials. Some information regarding the amount of separation of the scanned areas is required in such an embodiment; however, the same calibration parameters may be determined. The foregoing embodiment has the benefit of decreasing the amount of necessary data to be obtained and analyzed.

As set forth above, the foregoing embodiments are described in relation to a monochrome printing device; however, the present embodiments may also be used with color printing devices. For example, the background patterns and fiducials may be printed in any single color or combination of colors and the same measurements described above obtained. Moreover, IOP registration for each discreet color may be calibrated. Additionally, the toner/ink density of the background pattern and fiducials may be varied to optimize the performance of the present embodiments. For example, depending upon whether a monochrome printing device or color printing device is being calibrated, different toner densities of the background pattern and fiducials may provide improved IOP registration.

Moreover, as described above, by measuring various features of a diagnostic image and analyzing those measurements, the foregoing six calibration characteristics/parameters can be adjusted accordingly thereby tightly controlling IOP registration of printed images, e.g., single sided and double sided images and images printed by single, discreet printing devices as well as a plurality of printing devices arranged to communicate with each other. The foregoing embodiments improve the accuracy and precision of IOP registration, reduce the setup/calibration time in use and reduce the setup/calibration time during production. Although the deposition of toner/ink on an image bearing surface such as a photoreceptor belt can be controlled more accurately than the movement of paper through a printing device, one of ordinary skill in the art will recognize that both toner deposition and paper movement can be adjusted to improve IOP registration, and such modification is within the spirit and scope of the claimed embodiments.

Furthermore, the foregoing embodiments greatly reduce the time necessary for determining and implementing calibration parameters related to IOP registration. As described above, prior art methods require approximately forty-five minutes to complete the process for a single sheet, while the foregoing embodiments reduce this time to approximately one minute. Thus, more samples may be obtained, samples averaged and outliers filtered thereby resulting in increased accuracy in IOP registration.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of calibrating a printing system for positioning at least one printed image, said printing system comprising a first image bearing surface, said method comprising:
   a) forming a background pattern and at least three fiducials on said first image bearing surface, wherein said background pattern is larger than a first printed image, said background pattern comprises at least three patches and each of said at least three patches is in registered alignment with and partially overlaps each of at least three corners of said first printed image, and said at least three fiducials are within an area formed by said first printed image;
   b) transferring a portion of said first printed image to a second image bearing surface;
   c) measuring a first residual image on said first image bearing surface, wherein said first residual image is a portion of said background pattern and said at least three fiducials remaining on said first image bearing surface after said step of transferring; and,
   d) calculating at least one calibration parameter for said printing system based on said measuring of said first residual image.

2. The method of claim 1 wherein said step of measuring said first residual image comprises measuring at least one of: a first distance between a first fiducial and a second fiducial; a second distance between said first fiducial and a third fiducial; a third distance between said second fiducial and said third fiducial; a fourth distance between said second fiducial and a first edge of said transferred portion of said first printed image; a fifth distance between said third fiducial and said first edge of said transferred portion of said first printed image; a sixth distance between said third fiducial and a second edge of said transferred portion of said first printed image; a seventh distance between said second fiducial and a third edge of said transferred portion of said first printed image; a eighth distance between a first corner and a second corner of said background pattern; a ninth distance between said first corner and a third corner of said background pattern; a tenth distance between said second corner and said third corner of said background pattern; an eleventh distance between said first edge of said transferred portion of said first printed image and a first edge of said background pattern; a twelfth distance between said first edge of said transferred portion of said first printed image and said first edge of said background pattern, wherein a location of measurement of said twelfth distance is offset from a location of measurement of said eleventh distance; a thirteenth distance between said second edge of said transferred portion of said first printed image and a second edge of said background pattern; a fourteenth distance between said second edge of said transferred portion of said first printed image and said second edge of said background pattern, wherein a location of measurement of said fourteenth distance is offset from a location of measurement of said thirteenth distance; a fifteenth distance between a first corner and a second corner of said transferred portion of said first printed image; and, a sixteenth distance between said second corner and a third corner of said transferred portion of said first printed image.

3. The method of claim 2 wherein said second and third edges of said first residual image are oppositely disposed relative to each other.

4. The method of claim 2 wherein a line formed between said first and third corners of said background pattern and a line formed between said second and third corners of said background pattern are substantially orthogonal relative to each other.

5. The method of claim 1 wherein said step of measuring said first residual image comprises measuring at least one of: a seventeenth distance between a first edge of said transferred portion of said first printed image and a first edge of one of said at least three patches; and, an eighteenth distance between a second edge of said transferred portion of said first printed image and a second edge of one of said at least three patches.

6. The method of claim 1 wherein said background pattern is substantially uniform over an area formed by said background pattern.

7. The method of claim 6 wherein said at least three fiducials are within said area formed by said background pattern.

8. The method of claim 1 wherein said at least one calibration parameter is selected from the group consisting of: a process direction magnification factor; a cross-process direction magnification factor; a squareness factor; a process direction position factor; a cross-process direction position factor; a skew factor; and, combinations thereof.

9. The method of claim 1 wherein said step of measuring said first residual image comprising measuring a portion of said residual image.

10. The method of claim 1 further comprising:
   e) forming said background pattern and said at least three fiducials on a third image bearing surface, wherein said background pattern is larger than a second printed image and said at least three fiducials are within an area formed by said second printed image;

f) transferring a portion of said second printed image to a fourth image bearing surface;

g) measuring a second residual image on said third image bearing surface, wherein said second residual image is a portion of said background pattern and said at least three fiducials remaining on said third image bearing surface after said step of transferring; and, h) calculating at least one calibration parameter for said printing system based on said measuring of said second residual image.

11. The method of claim 10 wherein said first and third image bearing surfaces are a common surface.

12. The method of claim 10 wherein said second and fourth image bearing surfaces are oppositely disposed sides of a common surface.

13. The method of claim 12 wherein said common surface is a sheet of paper.

14. The method of claim 10 wherein said printing system comprises a first printing device.

15. The method of claim 14 wherein said printing system further comprises a second printing device tandemly arranged with said first printing device.

* * * * *